United States Patent [19]

Lipkin et al.

[11] Patent Number: 4,919,794

[45] Date of Patent: Apr. 24, 1990

[54] PROCESS FOR SEPARATING HYDROCARBONS

[75] Inventors: Gregory M. Lipkin, Secaucus; Joseph L. Niedzwiecki, Fanwood, both of N.J.

[73] Assignee: Exxon Research and Engineering Company, Florham Park, N.J.

[21] Appl. No.: 258,341

[22] Filed: Oct. 17, 1988

[51] Int. Cl.$^5$ ................................................ C10G 7/00
[52] U.S. Cl. .................................. 208/354; 208/355; 208/356
[58] Field of Search ............... 208/354, 355, 356, 351, 208/362, 363, 364

[56] References Cited

U.S. PATENT DOCUMENTS

| | | | |
|---|---|---|---|
| 2,321,826 | 6/1943 | Kraft et al. | 208/356 |
| 4,239,618 | 12/1980 | Peiser et al. | 208/355 |
| 4,415,443 | 11/1983 | Murphy | 208/354 X |
| 4,662,995 | 5/1987 | Lipkin et al. | 208/355 X |
| 4,702,819 | 10/1987 | Sharma et al. | 208/354 |

Primary Examiner—Glenn Caldarola
Attorney, Agent, or Firm—Roy J. Ott

[57] ABSTRACT

A process for improving the separation of a hydrocarbon mixture is provided in which the hydrocarbon mixture is separated into fractions in a distillation zone. A liquid fraction and a portion of the vapor phase fraction are removed from the distillation zone as sidestream and introduced into a separation zone comprising a stripping gas to be stripped simultaneously. The resulting stripped vapor is recycled to an upper portion of the distillation zone.

11 Claims, 1 Drawing Sheet

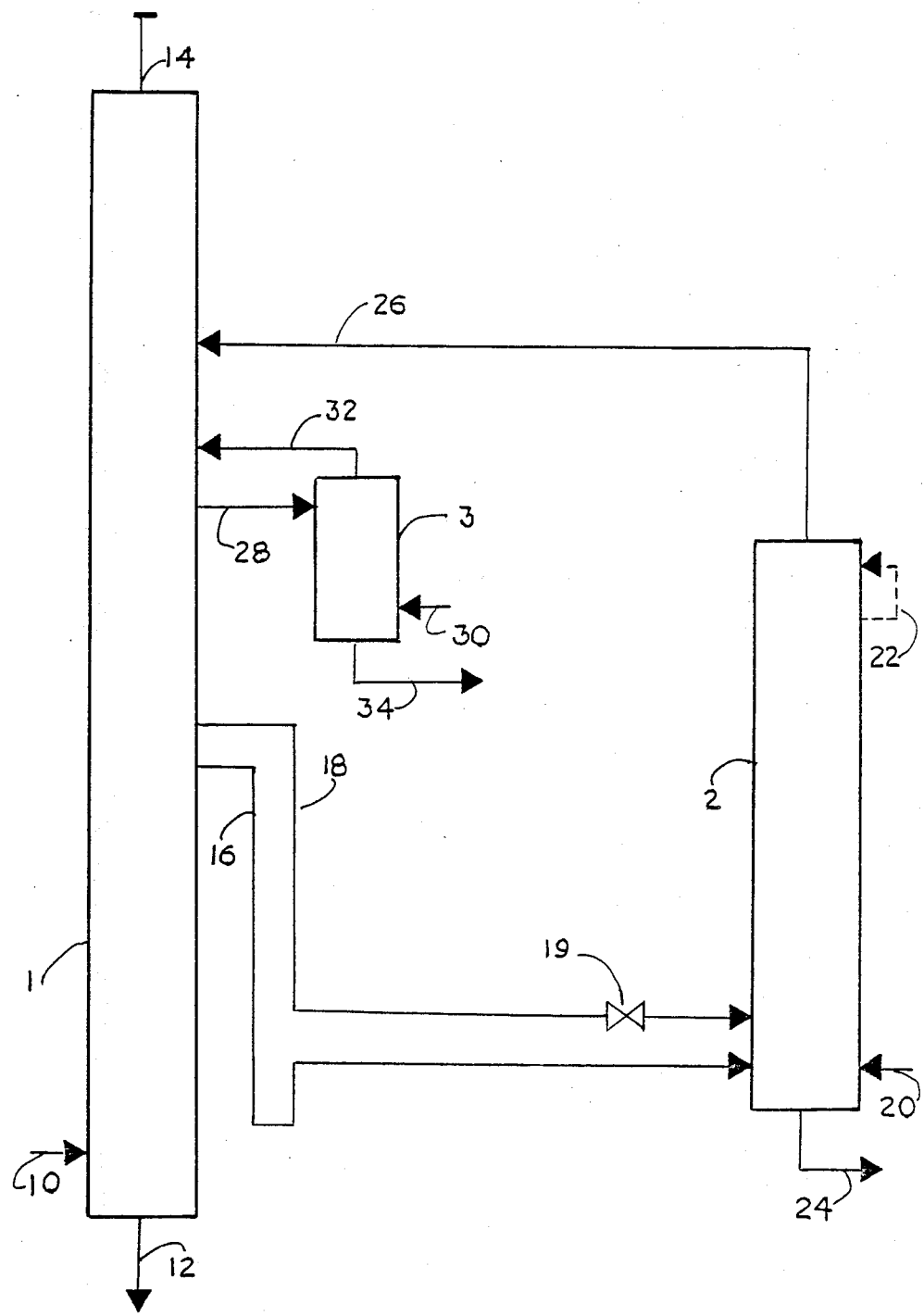

PROCESS FOR SEPARATING HYDROCARBONS

BACKGROUND OF THE INVENTION

1. Field of the Invention

This invention relates to an improved process for separating hydrocarbons into fractions having different boiling points. More particularly, this invention relates an improvement in a distillation process.

2. Description of Information Disclosures

Processes are known for separating mixtures of hydrocarbons into fractions having different boiling point ranges by subjecting the hydrocarbon mixture to a distillation zone to produce a vapor phase fraction, one or a plurality of liquid sidestreams, and a heavy bottoms fraction and in which processes one or more of the liquid sidestreams is passed to additional separation zones which may be stripping zones. It is also known to recycle the vapor product of these additional separation zones to the distillation zone (i.e. the main or first distillation zone).

U.S. Pat. No. 4,702,819 discloses a process for separating hydrocarbon mixtures in which a vapor sidestream and a bottoms liquid stream resulting from a first fractionation zone are introduced into a second fractionation zone. The overhead vapor stream of the second fractionation zone is recovered.

U.S. Pat. No. 4,415,443 discloses passing a bottoms liquid stream and an overflash sidestream from a first distillation tower to a second distillation tower. Both distillation towers comprise stripping zones. The vapor of the second distillation tower is introduced into the lower portion (stripping zone) of the first fractionation tower.

U.S. Pat. No. 4,662,995 discloses a method and apparatus for separating hydrocarbon mixtures by distillation, steam stripping a sidestream, returning a vapor separated in the sidestream stripper to the distillation zone at a location at least two trays and/or at least one theoretical stage above the liquid draw-off from the distillation zone to the sidestream stripping zone.

Although some of these processes increase the amount of lower boiling components that can be separated from the heavier fractions, there is still a need to improve the separation of lower components from the higher boiling components.

It has now been found that the amount of lower boiling components that can be separated from higher boiling components can be increased or the rate of removal of the lower boiling components from the distillation can be increased, in a hydrocarbon separation process, by passing at least a portion of the vapor phase fraction of the distillation zone to a separation zone in which a liquid sidestream fraction is separated in the presence of a stripping gas, and returning the resulting stripped vapor to the distillation zone.

SUMMARY OF THE INVENTION

In accordance with the invention, there is provided a process for separating a fluid hydrocarbon mixture which comprises the steps of: (a) separating said hydrocarbon mixture into at least a vapor phase fraction and a liquid fraction in a distillation zone; (b) introducing said liquid fraction and a portion of said vapor phase fraction into a separation zone comprising a stripping gas; and (c) passing the stripped vapor resulting from step (b) to said distillation zone of step (a).

BRIEF DESCRIPTION OF THE DRAWING

The FIGURE is schematic flow plan of one embodiment of the invention.

DESCRIPTION OF THE PREFERRED EMBODIMENT

Referring to the FIGURE, a fluid hydrocarbonaceous mixture is passed to distillation zone 1 by line 10. Distillation zone 1 (i.e. main distillation zone) may be an atmospheric distillation zone, a vacuum distillation zone or a superatmospheric distillation zone operated in a known manner. Preferably, the hydrocarbonaceous mixture is a hydrocarbonaceous oil. The hydrocarbonaceous mixture may be a virgin hydrocarbonaceous oil or a hydrocarbonaceous oil product resulting from a hydrocarbon conversion process. The hydrocarbonaceous mixture may be derived from any source, such as petroleum, shale oil, tarsand oil, products resulting from coal liquefaction, and mixtures thereof. These hydrocarbonaceous oils may contain contaminants such as sulfur and/or nitrogen compounds and may also contain metallic contaminants. The hydrocarbonaceous mixture is separated in distillation zone 1 into a plurality of fractions having different boiling point ranges, such as, a vapor phrase fraction which includes normally liquid hydrocarbons, one or more liquid fractions boiling in an intermediate range (sidestream fractions), and a heavy bottoms fraction. All boiling points referred to herein ae atmospheric pressure boiling points unless otherwise specified.

By the term "normally" with reference to "liquid hydrocarbons" is intended herein hydrocarbons that are liquid at standard temperature and pressure conditions. The heavy bottoms fraction is removed from the distillation zone 1 by line 12. A portion of the vapor phase fraction is removed from distillation zone 1 as overhead vapors by line 14. A first liquid stream in the intermediate boiling range is removed as a sidestream from distillation zone 1 and passed by 16 to separation zone 2 into which a stripping gas, such as steam or another inert gas is introduced by line 20. In accordance with the present invention, a portion of the vapor phase fraction of distillation zone 1 is removed as a sidestream by line 18 and passed into separation zone 2 to be subjected to separation simultaneously with the liquid fraction of line 16. The vapor phase fraction 18 is removed from the same section of distillation zone 1 as liquid fraction 16, preferably from the same tray. The boiling point range of the vapor phase fraction carried by line 18 may vary widely depending on the hydrocarbonaceous feed being distilled. The vapor flow rate through line 18 is controlled by a valve. The ratio of flow rates of the vapor to liquid sidestream fractions into separation zone 2 may vary widely depending on feed type and quality, operating conditions, and desired products. The flow rate ratios of vapor to liquid may, for example, range from about 2:1 to 10:1. Separation zone 2 comprises a stripping zone operated at conditions to remove the lightest components from the vapor and liquid streams introduced therein. Preferably, sepration zone 2 comprises a stripping zone in the lower portion and a fractionation zone (sidestream distillation zone) positioned above the stripping zone and into which the stripped vapors flow from the stripping zone into the fractionation zone.

Desirably, the internal reflux of separation zone 2 may be generated, for example, by removing a stream of product from the fractionation zone by line 22 and recycling it to the fractionation zone (i.e. pumparound). Alternatively, or additionally heat exchange means may be provided in separation zone 2 to cool the product or cooling may be provided by external reflux. The overhead vapor from separation zone 2 is removed by line 26 and introduced into an upper portion of distillation zone 1. A stripped fraction is removed from separation zone 2 by line 24.

Although the present invention is suitable for use in a process in which only one liquid sidestream is removed from the main distillation zone and wherein the liquid stream is stripped in an other separation zone, typically, distillation processes have more than one liquid sidestream. In a preferred embodiment shown in the FIGURE, an additional sidestream is shown. However, there may be other additional sidestreams not shown, including sidestreams above the introduction of line 26 into distillation zone 1. Each of these sidestreams may be subjected to additional separation or stripping.

Returning to the FIGURE, an other liquid fraction boiling in an intermediate boiling range is removed as a sidestream by line 28 and passed into a second separation zone 3 into which a stripping gas, such as steam, is introduced by line 30. Separation zone 3 is operated at conventional conditions which may vary widely. The resulting separated light components (i.e. second separation zone 3 overhead stream) are removed from separation zone 3 by line 32 and introduced into distillation zone 1. Another fraction is removed from separation zone 3 by line 34. The remaining vapor phase fraction (other portion which was not diverted into line 18) is removed from distillation zone 1 by line 14 as an overhead vapor phase stream. Vapor phase stream 14 has an increased amount of lower boiling components compared to conducting the same process with the same feed except without the feature of the present invention.

Although the present invention is particularly suitable for use in hydrocarbon distillation processes wherein the main distillation zone, typically may range from about 12 to about 25 feet in diameter with 25 to 55 trays and about 2 to about 5 sidestream separation zones, the present invention is also applicable to other processes having a main distillation zone and at least 1 sidestream separation zone. The main distillation zone 1 may be a trayed column, a packed column or may comprise other known vapor-liquid contacting means.

COMPARATIVE EXAMPLES A, B, AND C, AND EXAMPLE OF THE INVENTION

The following prophetic example of the invention (paper example) and comparative (paper) examples are presented to illustrate the invention. The examples were calculated using a distillation computer program.

A conventional atmospheric pipestill is simulated as Comparative Example A (base case). Crude oil is distilled in an atmospheric distillation column. In the process of distillation, the oil feed is separated into an overhead vapor phase fraction which includes normally liquid hydrocarbons such as naphtha, five sidestream fractions boiling in an intermediate boiling range, and a heavy bottoms fraction. Each sidestream is treated in a corresponding sidestream stripper in the presence of a stripping gas (e.g. steam) at stripping conditions for front-end correction, that is, to remove the lightest components from the sidestreams. Thirteen theoretical trays are postulated to be between sidestream 2 (this is the second sidestream when the first sidestream is counted from the top of pipestill). This second sidestream of the Examples will, hereinafter, be designated SS2, and sidestream 3 will, hereinafter, be designated SS3. Two other examples of atmospheric distillation simulation, namely, Comparative Example B and Comparative Example c were also calculated. The calculated results are summarized in Table I.

TABLE I

| Simulated Example Section | Product Rates, KB/D | | Product Quality (15/5 Distillation, °F.) | | | | | SS2 Section Vapor Rate CFS |
|---|---|---|---|---|---|---|---|---|
| | | | SS1 | | SS2 | | SS3 | |
| | SS2 | SS3 | 95% | FBP | 95% | FBP | IBP | |
| Comparative Example A (Base Case) | 16 | 13 | 383 | 418 | 471 | 483 | 290 | 795 |
| Comparative Example B | 20 | 9 | 385* | 420* | 492 | 510 | 307 | 794 |
| Comparative Example C | 20 | 9 | 382 | 418 | 476 | 502 | 302 | 834* |
| Example of the Present Invention | 20 | 9 | 380 | 417 | 503 | 515 | 301 | 733 |
| Specification/ Limitations | | | 383 (Max) | 418 (Max) | 503 (Max) | 515 (Max) | 290 (Max) | 795 (Max) |

Footnotes:
SS = Sidestream
FBP = Final Boiling Point
IPB = Initial Boiling Point
*Exceeds Limitation
KB/D = Thousand barrels per day As can be seen from Table I, in Comparative Example A (base case) distillation, the SS2 product final boiling point (FBP) is considerably below the desired specification. This shows that not enough desired product is recovered. Attempts to increase the rate of the SS2 product at the expense of the SS3 product without changing the pumparound duties (the recycle stream) as in Comparative Example B leads to the deterioration of the SS1 product quality. This is due to the decrease in internal reflux in the SS2 section. In Comparative Example C, the corresponding adjustment of the pumparound duties (internal reflux improvement) results in the SS2 vapor rate being increased above the limiting value.

In contrast, in the Example of the present invention, the SS2 product rate can be increased at the expense of the SS3 product without departing from the limitations of product quality and of the SS2 section internal vapor rate. The SS2 liquid flow rate from the main distillation tower to the sidestream column is 153 mph (moles per hour), while the vapor draw-off rate from the SS2 section to the sidestream column is 1150 mph. The sidestream column consists of 9 theoretical trays (7 distillation trays and 2 stripping trays). The column overhead pumparound duty is 20 MBtu/Hr (million British thermal units per hour). As can be seen from Table I, in the Example of the present invention, the estimated yield is increased by about 25% while the SS2 section vapor rate is decreased by about 8.5% compared to Comparative Example A (base case).

The heat and materials balances for the Example of the invention and for Comparative Examples A, B, and C are shown in Table II.

TABLE II

|  | Comparative Example A | Example of the Invention |
|---|---|---|
| Flow rates, KB/D |  |  |
| feed | 187.5 | 187.5 |
| distillate | 35.0 | 35.0 |
| SS1 product | 8.5 | 8.5 |
| SS2 product | 16.0 | 20.0 |
| SS3 product | 13.0 | 9.0 |
| SS4 product | 21.0 | 21.0 |
| SS5 product | 19.0 | 19.0 |
| bottoms | 75.0 | 75.0 |
| SS2 liquid to (MPH) sidestream column |  | 153 |
| SS2 vapor to (MPH) sidestream column | None | 1150 |
| Pumparound duties MBtu/Hr |  |  |
| PA1 | 80.5 | 80.5 |
| PA2 | 27.5 | 32.5 |
| PA3 | 32.0 | 32.0 |
| PA4 | 96.0 | 92 |
| PA5 | 127.0 | 106 |
| Sidestream column PA | None | 20.0 |

Footnotes:
SS = Sidestream
PA = Pumparound
KB/D = Thousand barrels per day
MPH = Moles per hour
MBtu/Hr = Million British thermal units per hour

We claim:

1. A process for separating a fluid hydrocarbon mixture which comprises the steps of:
   (a) separating said hydrocarbon mixture into at least a vapor phase fraction, a liquid fraction and a bottoms fraction having a higher boiling point than said liquid fraction in a distillation zone;
   (b) introducing said liquid fraction and a portion of said vapor phase fraction into a separation zone;
   (c) introducing a stripping gas into said separation zone to remove the lightest components from said liquid and vapor fractions introduced therein; and
   (d) passing the stripped vapor stream resulting from step (b) to said distillation zone of step (a).

2. The process of claim 1, wherein a second liquid fraction is separated from said distillation zone of step (a) and wherein said separated second liquid fraction is introduced into a second separation zone comprising a stripping gas, and wherein the resulting second separation zone stripped vapor stream is passed to said distillation zone of step (a).

3. The process of claim 1, wherein said mixture of hydrocarbons introduced into said distillation zone of step (a) is a hydrocarbonaceous oil.

4. The process of claim 1, wherein said liquid fraction and said portion of vapor phase fraction introduced into said separation zone of step (b) were removed from the same section of said distillation zone of step (a).

5. The process of claim 1, wherein in step (d), said stripped vapor is passed into an upper portion of said distillation zone.

6. The process of claim 1, wherein the flow ratio of vapor to liquid into said separation zone of step (b) ranges from about 2:1 to about 10:1.

7. The process of claim 1 wherein said separation zone of step (b) comprises a stripping zone and a fractionation zone positioned above said stripping zone and wherein the stripped vapors flow from said stripping zone to said fractionation zone, and wherein the resulting stripped vapor fraction is removed from said fractionation zone and passed to said distillation zone of step (a).

8. The process of claim 7, wherein a hydrocarbonaceous stream is removed from said fractionation zone and recycled to an upper portion of said fractionation zone.

9. The process of claim 7, wherein a product of said separation zone of step (b) is cooled by heat exchange means disposed in the upper portion of said separation zone of step (b).

10. The process of claim 1, wherein a portion of said vapor phase fraction of said distillation zone of step (a) is recovered overhead and said recovered overhead vapor fraction comprises an increased amount of lower boiling components.

11. The process of claim 1, wherein the flow of said portion of said vapor phase fraction and said distillation zone of step (a) to said separation zone of step (b) is controlled by a valve.

* * * * *